(12) United States Patent
Deckelmann et al.

(10) Patent No.: US 7,298,381 B1
(45) Date of Patent: Nov. 20, 2007

(54) ARRANGEMENT FOR MIXING AND/OR PROCESSING VIDEO SIGNALS

(75) Inventors: Winfried Deckelmann, Weiterstadt (DE); Sieghard Hasenzahl, Riestadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/181,159

(22) Filed: Oct. 28, 1998

(30) Foreign Application Priority Data

Oct. 31, 1997 (DE) ................................. 197 48 139

(51) Int. Cl.
  *G09G 5/00* (2006.01)
  *G09G 5/02* (2006.01)
  *G06F 17/00* (2006.01)
  *G06T 1/00* (2006.01)

(52) U.S. Cl. ........................ 345/619; 345/418; 345/592

(58) Field of Classification Search ................ 345/589, 345/592, 418, 629; 348/577–578, 585–595
  See application file for complete search history.

(56) References Cited

U.S. PATENT DOCUMENTS

| | | | |
|---|---|---|---|
| 5,077,608 A | 12/1991 | Dubner | 358/183 |
| 5,162,904 A | 11/1992 | Beaulier et al. | 358/181 |
| 2002/0018070 A1* | 2/2002 | Lanier | 345/629 |

\* cited by examiner

*Primary Examiner*—Chante Harrison
(74) *Attorney, Agent, or Firm*—Joseph J. Laks; Robert B. Levy; Jorge Tony Villabon

(57) ABSTRACT

For a possibly flexible use of an arrangement (1) for mixing and/or processing one or more video signals, the arrangement (1) includes video hardware components (2) which are implemented for a dedicated purpose and, within the arrangement (1), are exclusively usable for said dedicated purpose, in that the arrangement (1) also includes video computers (3, 4) which can alternatively perform a plurality of functions and are thus usable within the arrangement (1) for different purposes, dependent on their need, the video hardware components (2) being implemented for uses which are computer-intensive and/or require a large bandwidth, the video computers (3, 4) being provided for uses which can be processed in real time by the video computers (3, 4), the arrangement (1) accommodating a control circuit (6) which assigns tasks to the video computers (3, 4), dependent on their need.

20 Claims, 2 Drawing Sheets

ARRANGEMENT FOR MIXING AND/OR PROCESSING VIDEO SIGNALS

BACKGROUND OF THE INVENTION

1. Field of the Invention

The invention relates to an arrangement for mixing and/or processing one or more video signals.

2. Description of the Related Art

Dedicated hardware components are provided in such prior-art arrangements for the various uses of such arrangements. This renders the use of such arrangements inflexible.

SUMMARY OF THE INVENTION

It is an object of the invention to further improve an arrangement of the type described in the opening paragraph, allowing a more flexible and more versatile use.

According to the invention, this object is solved in that the arrangement comprises video hardware components which are implemented for a dedicated purpose and, within the arrangement, are exclusively usable for this dedicated purpose, in that the arrangement further comprises video computers which can alternatively perform a plurality of functions and are thus usable within the arrangement for different purposes, dependent on their need, the video hardware components being implemented for uses which are computer-intensive and/or require a large bandwidth, the video computers being provided for uses which can be processed in real time by the video computers, the arrangement accommodating a control circuit which assigns tasks to the video computers, dependent on their need.

The arrangement comprises elements of two different categories. The first category includes video hardware components which are implemented for a fixed purpose and can exclusively be used for this purpose. These video hardware components are provided for uses which can hardly be fulfilled by other components, namely, particularly those uses which are computer-intensive or require a large bandwidth. For such purposes, dedicated video hardware componnets can be advantgeously used as before.

The arrangement further comprises elements of a second category, namely, video computers which can alternatively perform a plurality of functions. The video computers are provided for those purposes which can be processed by them in real time, i.e., it must be possible to process a video signal in real time and in the desired manner. The video computers may be usable within the arrangement, dependent on their need, for different purposes. Thus, not every use requires its own element, but rather one or more video computers may be alternatively used for different purposes.

The arrangement further comprises a control circuit which assigns a corresponding function to the video computers, dependent on the need. This function may be changed any time so that a switch or modification of the function of the arrangement is possible within a short time.

This implementation of the arrangement makes it flexible, i.e. dependent on the purpose for which it is to be used, it can process video signals in different ways. This is particularly achieved by the flexible use of the video computers.

The variable use of the video computers, particularly when their functions are software-controlled, allows additional and/or new functions to be realized any time, because only the software is to be changed for this purpose. The video hardware components may be advantageously implemented as video mixer stages or video crossbars.

The flexibility of the possible use of the video computers for different purposes can be advantageously achieved in that, the desired function of the video computers can be activated by software which is loadable in dependence upon the need.

This software may render the video computer suitable, for example, for such uses as chromakey, lumakey or trick effects.

Within the arrangement, the video hardware components and the video computers are advantageously coupled by means of a connection which can handle a sufficiently large quantity of data. A wideband bus system or a video crossbar can be used advantageously.

Particularly when the variable functions of the video computers are activated by means of software, the software computers may advantageously comprise standard processors. Even a standard computer built on a board may be used, which renders the arrangement particularly economic.

A further embodiment of the invention utilizes the possible flexible use of the video computers for a combined use of a plurality of arrangements for mixing or processing one or more video signals. For such a combined use, at least one video computer of at least one of the arrangements may be variably used not only as regards its own purpose of use, but also as regards its purpose of use in one of the two arrangements, i.e., the video computer can be assigned to the one or the other arrangement, as the case may be, and fulfill a function, dependent on the need, in this arrangement. This is also possible for more video computers so that, basically, the video computers can be used variably in one or more arrangements of a plurality of coupled arrangements. This further enhances the flexibility of use of the arrangements.

These and other aspects of the invention are apparent from and will be elucidated with reference to the embodiments described hereinafter.

PREFERRED EMBODIMENTS

Figure 1:
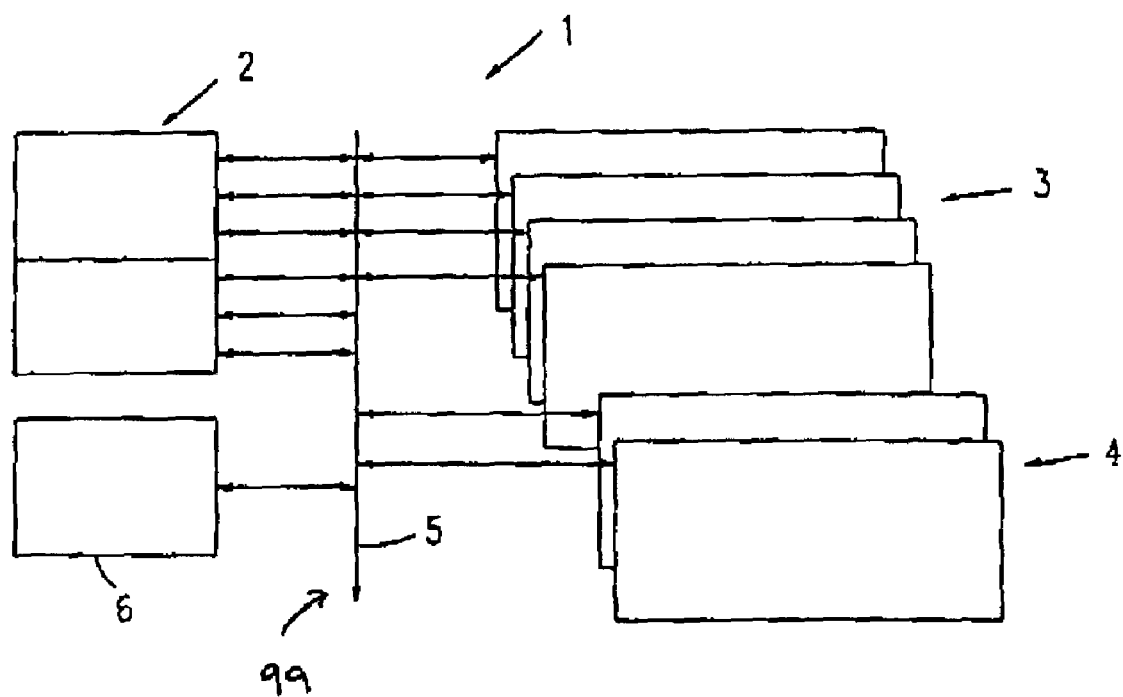
FIG. 1 is a block diagram of an arrangement 1 for mixing and/or processing one or more video signals, according to an illustrative embodiment of the present invention.

The arrangement 1 accommodates video hardware components 2. The video hardware components are implemented for a fixed use and can exclusively perform the assigned use within the arrangement 1. Particularly, those functions are concerned which can be performed with difficulty by means of computers, namely, computer-intensive or bandwidth-intensive tasks. This may also concern, for example, the mixing of a plurality of video signals. The video hardware components 2 can thus realize particularly video mixer stages or video crossbars.

The arrangement 1 further accommodates video computers 3 and 4. In contrast to the hardware components 2, the video computers 3 and 4 can be used in variable ways. They can fulfill different purposes of use. The video computers 3 and 4 may be controlled, for example, by software which can be loaded, dependent on their need, i.e., they may perform different functions, dependent on the loaded software. On the other hand, their function is thereby individually changeable, dependent on the need, and, on the other hand, modification of the functions can be realized by means of modified software, or new functions can be realized by means of new software.

The arrangement comprises a wideband bus 5 by means of which the video hardware components 2 and the video computers 3 and 4 are coupled. The video hardware components and the video computers may also be coupled by means of a video crossbar 99. The video data can be transmitted in an unprocessed or a processed form via this wideband bus 5.

The arrangement 1 also comprises a control circuit 6 which is provided to assign the relevant desired function, dependent on the need, to the video computers 3 and 4. For example, the control circuit 6 may trigger the loading of the software in the video computers 3 and 4 required in dependence upon the desired function.

Due to the variable functions of the video computers 3 and 4, such an arrangement 1 can be flexibly used and also adapted any time to new desired functions by means of modified software.

These advantages of the arrangement 1 shown in FIG. 1 can even be enhanced in a combination use of two or more arrangements.

Figure 2:
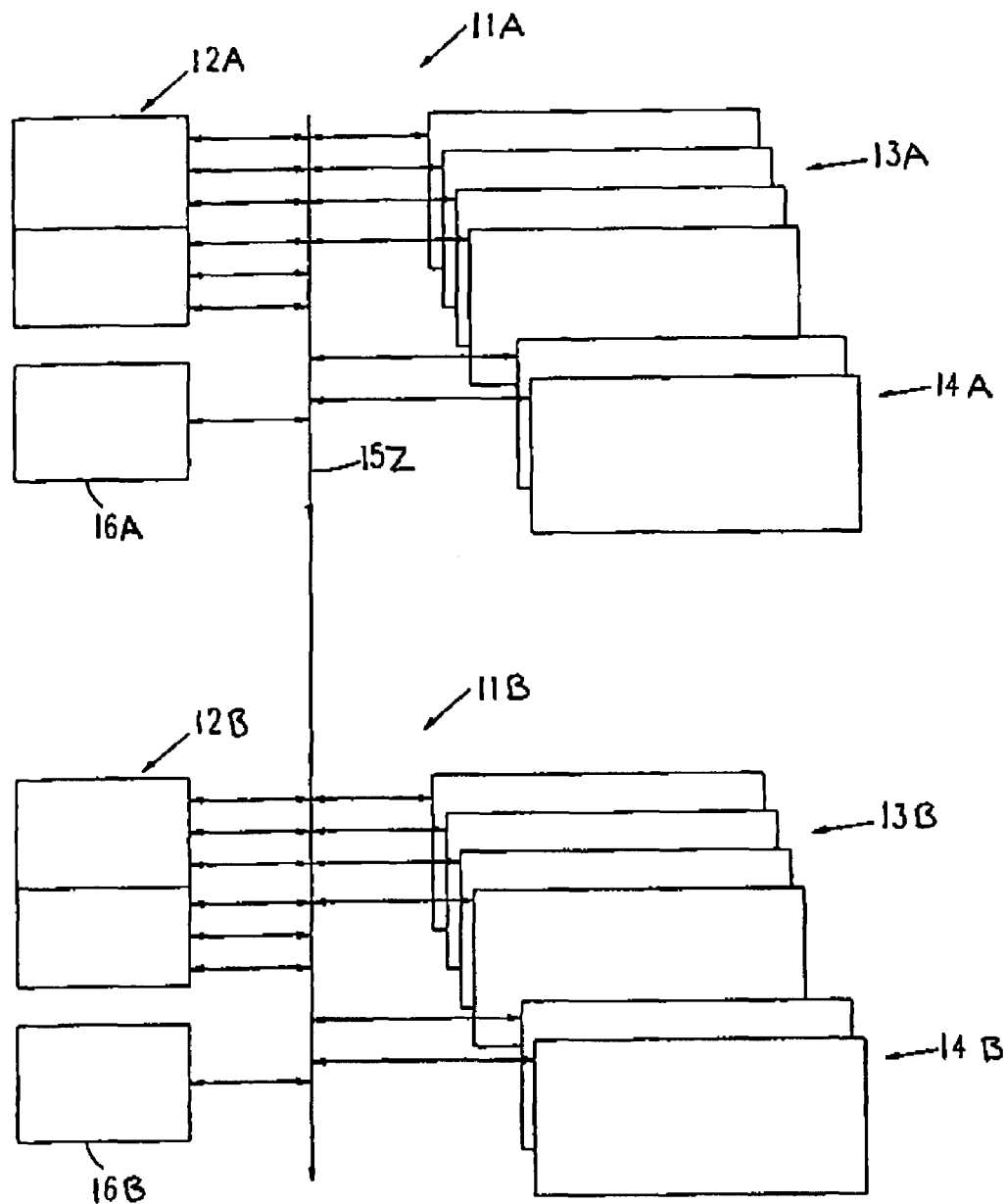
FIG. 2 is a block diagram of a first arrangement 11A and a second arrangement 11B for mixing and/or processing one or more video signals, according to another illustrative embodiment of the present invention.

FIG. 2 is a block diagram of a first arrangement 11A and a second arrangement 11B for mixing and/or processing one or more video signals, according to another illustrative embodiment of the present invention. It is to be appreciated that while only two arrangements are shown in FIG. 2, as noted above, more than two arrangements may be employed while maintaining the spirit of the present invention. In this case, the first arrangement 11A is coupled to the second arrangement 11B via a wideband bus 15Z. The first arrangement 11A includes first video hardware components 12A, first video computers 13A and 14A, and a first control circuit 16A. The second arrangement 11B includes second video hardware components 12B, second video computers 13B and 14B, and a second control circuit 16B. In this case, at least one of the video computers, for example, first video computer 14A of arrangement 11A, can be advantageously used in a variable manner either in the first arrangement 11A or in the second arrangement 11B. Fewer video computers are thereby required within an arrangement because, dependent on their need, they may be assigned to either the first arrangement 11A or the second arrangement 11B for processing video signals. This means that, for example, the video computer 14A of the first arrangement 11A may also be used in the second arrangement 11B. Conversely, video computer 14B of the second arrangement 11B may also be used in the first arrangement 11A.

The video computers may be advantageously used particularly for those tasks which can be processed in real time by means of computers. These may be, for example, chromakey, lumakey or trick effects.

The invention claimed is:

1. An arrangement for at least one of mixing and processing one or more video signals, comprising:
a first and a second arrangement of video hardware components and video computers, the video hardware components being implemented for a dedicated purpose and exclusively usable for said dedicated purpose, and the video computers each being non-dedicated to a specific purpose and capable of performing a plurality of functions that are dynamically changeable independent of one another, depending on a current need to be filled by the video computers; and
a control circuit for assigning tasks to the video computers, depending on the current need, wherein the video hardware components are implemented for uses which are computer-intensive and/or require a large bandwidth, and the video computers are provided for uses which can be processed in real time by the video computers, wherein the first and the second arrangement of video hardware components and video computers are coupled, wherein video data are exchangeable between the first and the second mixing and/or processing arrangements, and wherein at least one of the mixing and/or processing arrangements comprises a video computer which, dependent on the need, is assignable to one of the two mixing and/or processing arrangements.

2. The arrangement as claimed in claim 1, wherein the video hardware components are implemented as video mixer stages.

3. The arrangement as claimed in claim 1, wherein the relevant desired function of the video computers are activated by software which is loadable in dependence upon the current need.

4. The arrangement as claimed in claim 1, wherein the video computers are loadable with software provided for chromakey or lumakey effects.

5. The arrangement as claimed in claim 1, wherein the video hardware components and the video computers in the first and the second arrangement are coupled by means of a respective wideband bus system.

6. The arrangement as claimed in claim 1, wherein the video hardware components and the video computers in the first and the second arrangement are coupled by means of a respective video crossbar.

7. The arrangement as claimed in claim 1, wherein the video computers comprise standard processors.

8. An arrangement as claimed in claim 1, wherein the video hardware components are implemented as video crossbars.

9. The arrangement as claimed in claim 1, wherein the video computers are loadable with software provided for trick effects.

10. The arrangement as claimed in claim 1, wherein first and the second arrangement of video hardware components and video computers are coupled by means of a wideband bus system.

11. A plurality of arrangements for at least one of mixing and processing one or more video signals, comprising:
a first arrangement and a second arrangement,
wherein each of the first arrangement and the second arrangement include: video hardware components implemented for a dedicated purpose and exclusively usable for said dedicated purpose;
video computers, each being non-dedicated to a specific purpose and capable of performing a plurality of functions that are dynamically changeable independent of one another depending on a current need to be filled by the video computers; and
a control circuit for assigning tasks to the video computers, depending on the current need, and
wherein any of said video computers included in one of said first arrangement and said second arrangement may be dynamically assignable for use by said other one of said first arrangement and said second arrangement for processing video signals, on an as-needed basis, so as to minimize an overall number of video computers included in any one of said first arrangement and said second arrangement.

12. The arrangement as claimed in claim 11, wherein the video hardware components are implemented as video mixer stages.

13. The arrangement as claimed in claim 11, wherein the relevant desired function of the video computers are activated by software which is loadable in dependence upon the current need.

14. The arrangement as claimed in claim 11, wherein the video computers are loadable with software provided for chromakey or lumakey effects.

15. The arrangement as claimed in claim 11, wherein the video hardware components and the video computers are coupled by means of a wideband bus system.

16. The arrangement as claimed in claim 11, wherein the video hardware components and the video computers are coupled by means of a video crossbar.

17. The arrangement as claimed in claim 11, wherein the video computers comprise standard processors.

18. An arrangement as claimed in claim 11, wherein the video hardware components are implemented as video crossbars.

19. The arrangement as claimed in claim 11, wherein the video computers are loadable with software provided for trick effects.

20. The arrangement as claimed in claim 11, wherein the plurality of arrangements for at least one of mixing and processing one or more video signals are coupled by means of a wideband bus system.

* * * * *